United States Patent
Kubo (10) Patent No.: US 8,730,290 B2
(45) Date of Patent: May 20, 2014

(54) LIGHT SOURCE DEVICE WITH LIGHT SOURCE AND LIGHT-RECEIVING ELEMENT FIXED TO EACH OTHER

(75) Inventor: Nobuaki Kubo, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 421 days.

(21) Appl. No.: 12/398,292

(22) Filed: Mar. 5, 2009

(65) Prior Publication Data

US 2009/0231557 A1    Sep. 17, 2009

(30) Foreign Application Priority Data

Mar. 17, 2008    (JP) .................................. 2008-067886

(51) Int. Cl.
*B41J 2/435* (2006.01)
*B41J 2/455* (2006.01)
*B41J 2/45* (2006.01)
*B41J 15/14* (2006.01)
*B41J 27/00* (2006.01)

(52) U.S. Cl.
CPC ...................................... *B41J 2/455* (2013.01)
USPC ........... 347/257; 347/236; 347/238; 347/241; 347/242; 347/246

(58) Field of Classification Search
CPC .............. B41J 2/45; B41J 2/451; B41J 2/455; B41J 2/471; B41J 2/473; G03G 15/043; G03G 15/326; G06K 15/247; G06K 15/1214; G02B 26/12; G02B 26/123; H04N 1/1135; H04N 1/40031
USPC ................... 347/236, 242, 246, 257, 238, 241
See application file for complete search history.

(56) References Cited

U.S. PATENT DOCUMENTS

| 5,432,537 | A | * | 7/1995 | Imakawa et al. | ............... | 347/135 |
| 6,376,837 | B1 | | 4/2002 | Itabashi et al. | | |
| 7,075,688 | B2 | * | 7/2006 | Nakajima | ................... | 359/204.1 |
| 7,119,825 | B2 | * | 10/2006 | Vazan | ........................... | 347/236 |
| 7,301,554 | B2 | | 11/2007 | Kubo | | |
| 7,342,599 | B2 | * | 3/2008 | Maeda et al. | ................... | 347/242 |
| 7,511,868 | B2 | * | 3/2009 | Nakajima | ................... | 359/204.1 |
| 7,535,610 | B2 | * | 5/2009 | Kitaoka et al. | ............. | 359/196.1 |

(Continued)

FOREIGN PATENT DOCUMENTS

| JP | 3-92812 A | 4/1991 |
| JP | 6-130267 A | 5/1994 |

(Continued)

OTHER PUBLICATIONS

Agilent Technologies, Laser and Optics User's Manual, Jul. 2002, p. 4-12.*

*Primary Examiner* — Laura Martin
*Assistant Examiner* — Jeremy Bishop
(74) *Attorney, Agent, or Firm* — Dickstein Shapiro LLP (57) ABSTRACT

A light source includes a plurality of light-emitting units arranged in a two-dimensional array. An optical element changes divergence angles of laser beams from the light-emitting units. A splitting element splits a part of each of the laser beams passing through the optical element. A compensating element compensates for a fluctuation in the divergence angle of each of the laser beams incident on the splitting element due to a change of temperature. A light-receiving element receives laser beams split by the splitting element. The light source, the optical element, the splitting element, the compensating element, and the light-receiving element are integrally supported.

12 Claims, 8 Drawing Sheets

(56) References Cited

U.S. PATENT DOCUMENTS

| | | | |
|---|---|---|---|
| 7,561,318 | B2 | 7/2009 | Nakajima |
| 7,710,445 | B2 * | 5/2010 | Amada et al. ............... 347/238 |
| 7,800,641 | B2 * | 9/2010 | Kubo et al. .................. 347/245 |
| 7,936,492 | B2 * | 5/2011 | Amada et al. ............. 359/196.1 |
| 8,085,457 | B2 | 12/2011 | Ichii et al. |
| 8,169,457 | B2 * | 5/2012 | Kubo et al. .................. 347/242 |
| 8,339,435 | B2 * | 12/2012 | Yamakawa et al. .......... 347/263 |
| 8,466,947 | B2 * | 6/2013 | Kubo .......................... 347/238 |
| 2004/0075912 | A1 * | 4/2004 | Kim ............................. 359/641 |
| 2007/0035796 | A1 * | 2/2007 | Nakajima .................... 359/204 |
| 2007/0058232 | A1 * | 3/2007 | Nakajima .................... 359/205 |
| 2007/0081152 | A1 * | 4/2007 | Amada ..................... 356/237.3 |
| 2008/0100895 | A1 | 5/2008 | Hayashi et al. |
| 2008/0123159 | A1 | 5/2008 | Hayashi et al. |
| 2008/0219601 | A1 | 9/2008 | Arai et al. |
| 2008/0239433 | A1 * | 10/2008 | Amada et al. ............... 359/204 |
| 2009/0052944 | A1 * | 2/2009 | Kubo et al. .................. 399/220 |
| 2009/0060583 | A1 * | 3/2009 | Amada et al. ............... 399/221 |

FOREIGN PATENT DOCUMENTS

| | | | | |
|---|---|---|---|---|
| JP | 6-164070 A | | 6/1994 | |
| JP | 7-115511 A | | 5/1995 | |
| JP | 10-324018 A | | 12/1998 | |
| JP | 2002-6211 A | | 1/2002 | |
| JP | 2002-341273 | | 11/2002 | |
| JP | 2003-132580 | | 5/2003 | |
| JP | 2003-211728 | | 7/2003 | |
| JP | 2004-006592 | | 1/2004 | |
| JP | 2005161790 A | * | 6/2005 | ............. B41J 2/44 |
| JP | 2007-41333 A | | 2/2007 | |
| JP | 2007-79295 A | | 3/2007 | |
| JP | 2007-156259 A | | 6/2007 | |
| JP | 2007-298563 A | | 11/2007 | |

* cited by examiner

LIGHT SOURCE DEVICE WITH LIGHT SOURCE AND LIGHT-RECEIVING ELEMENT FIXED TO EACH OTHER

CROSS-REFERENCE TO RELATED APPLICATIONS

The present application claims priority to and incorporates by reference the entire contents of Japanese priority document 2008-067886 filed in Japan on Mar. 17, 2008.

BACKGROUND OF THE INVENTION

1. Field of the Invention

The present invention relates to a light source device emitting a laser beam for an optical scanning device that scans a scanning surface with the laser beam.

2. Description of the Related Art

In a typical image forming apparatus forming an image with a laser beam, an image is formed, for example, in such a manner that a surface of a photosensitive drum is exposed to the laser beam thereby forming a latent image on the surface of the photosensitive drum. The latent image is developed into a toner image. The toner image on the surface of the photosensitive drum is transferred onto a recording medium such as a sheet, and the transferred toner image is fixed on the recording medium. Such an image forming apparatus has been often used in an on-demand printing system for an easy printing. There have been increasing demands on the image forming apparatus to form an image at high density and to output the formed image at high speed.

In response to the demands, recently, there has been developed an image forming apparatus including a light source such as a vertical cavity surface emitting laser (VCSEL) in which multiple light-emitting units are two-dimensionally arrayed in a monolithic manner. Multiple laser beams emitted from the light source make it possible to simultaneously scan a plurality of scanning lines on a scanning surface. Unlike an image forming apparatus employing an edge-emitting laser light source, the image forming apparatus employing the VCSEL splits a laser beam emitted from the VCSEL so as to take out a portion of the laser beam, and detects an intensity of the portion thereby monitoring an intensity of the laser beam emitted toward the scanning surface (see, for example, Japanese Patent Application Laid-open No. 2003-132580).

In an image forming apparatus using a plurality of laser beams, an optical adjustment of an interval between scanning lines on a scanning surface is made, for example, by rotating a light source around an optical axis of an optical system or the like. However, due to the rotation of the light source, relative positions of the light source and a monitoring unit for monitoring the intensity of the laser beam fluctuate disadvantageously.

SUMMARY OF THE INVENTION

It is an object of the present invention to at least partially solve the problems in the conventional technology.

According to one aspect of the present invention, there is provided a light source device including a light source in which a plurality of light-emitting units each emitting a laser beam arranged in a two-dimensional array; an optical element that changes a divergence angle of each of laser beams emitted from the light-emitting units; a splitting element that splits a part of each of the laser beams passing through the optical element; a compensating element that compensates for a fluctuation in the divergence angle of each of the laser beams incident on the splitting element due to a change of temperature; and a light-receiving element that receives the laser beams split by the splitting element. The light source, the optical element, the splitting element, the compensating element, and the light-receiving element are integrally supported.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Exemplary embodiments of the present invention are explained in detail below with reference to the accompanying drawings.

Figure 1:
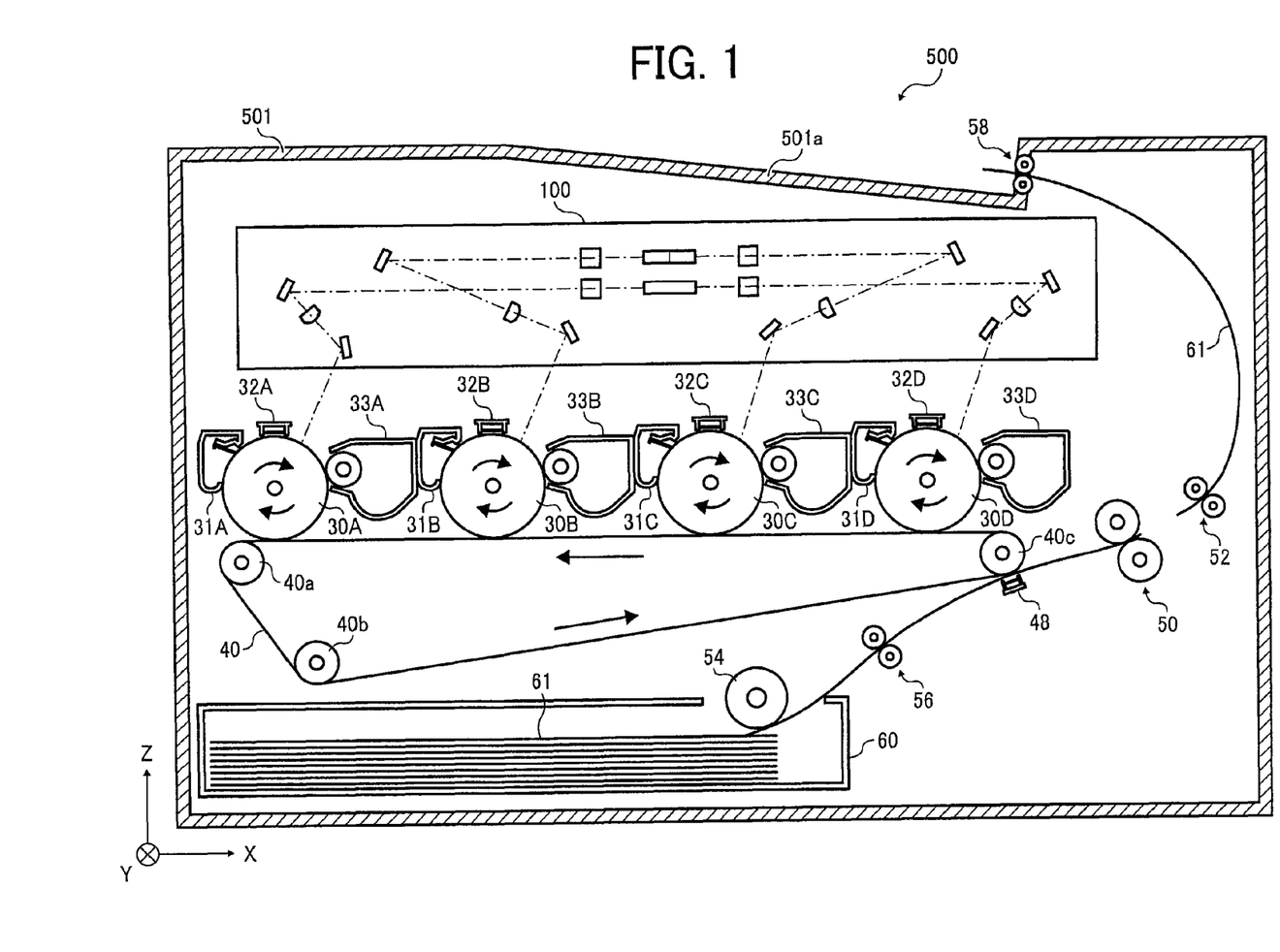
FIG. 1 is a schematic diagram of an image forming apparatus according to an embodiment of the present invention.

FIG. 1 is a schematic diagram of an image forming apparatus 500 according to an embodiment of the present invention. The image forming apparatus 500 is a tandem-type color printer capable of printing out a multicolor image. The image forming apparatus 500 forms the multicolor image, for example, by transferring black (K), yellow (Y), magenta (M), and cyan (C) toner images onto plain paper (a sheet) in a superimposed manner. As shown in FIG. 1, the image forming apparatus 500 includes an optical scanning device 100, four photosensitive drums 30A, 30B, 30C, and 30D, a transfer belt 40, a sheet feed tray 60, a sheet feed roller 54, a pair of first registration rollers 56, a pair of second registration rollers 52, a pair of fixing rollers 50, a pair of sheet discharging rollers 58, a control unit (not shown) for controlling the entire image forming apparatus 500 including the above units, and a housing 501 in which the above units and elements are housed.

A sheet discharge tray 501a is formed on top of the housing 501. A sheet on which an image has been printed is discharged onto the sheet discharge tray 501a. The optical scanning device 100 is arranged below the sheet discharge tray 501a.

The optical scanning device 100 emits a laser beam corresponding to a K-color image component that is modulated based on image data received from a higher-level device (such as a personal computer) to the photosensitive drum 30A. Likewise, the optical scanning device 100 emits a laser beam corresponding to a C-color image component to the photosensitive drum 30B, a laser beam corresponding to a M-color image component to the photosensitive drum 30C, and a laser beam corresponding to a Y-color image component to the photosensitive drum 30D. The configuration of the optical scanning device 100 will be explained in detail later.

The four photosensitive drums 30A to 30D have a cylindrical shape, and a photosensitive layer having a conducting property is formed on the surface of each of the photosensitive drums 30A to 30D. When the surface of the photosensitive drum is exposed to the laser beam, the exposed portion of the photosensitive drum conducts electricity. The photosensitive drums 30A, 30B, 30C, and 30D are arranged below the optical scanning device 100 at equally-spaced intervals along an X-axis direction.

The photosensitive drum 30A is arranged at the extremity of inside the housing 501 on the negative X-axis side so that a long side of the photosensitive drum 30A is oriented in a Y-axis direction. The photosensitive drum 30A is rotated clockwise in FIG. 1 (a direction of arrows shown in FIG. 1) by a rotating mechanism (not shown). A charging unit 32A is arranged at a 12 o'clock position (the topside), a toner cartridge 33A is arranged at a 2 o'clock position, and a cleaning case 31A is arranged at a 10 o'clock position in FIG. 1 so as to encircle the photosensitive drum 30A.

The charging unit 32A is arranged so that a long side of which is oriented in the Y-axis direction, and opposed to the surface of the photosensitive drum 30A via a predetermined clearance. The charging unit 32A charges the surface of the photosensitive drum 30A at a predetermined voltage.

The toner cartridge 33A includes a cartridge main body filled with K-toner and a developing roller charged at a voltage of a polarity opposite to that of the photosensitive drum 30A. The K-toner filled in the cartridge main body is supplied to the surface of the photosensitive drum 30A via the developing roller.

The cleaning case 31A includes a rectangular cleaning blade. A long side of the cleaning blade is oriented in the Y-axis direction. The cleaning case 31A is arranged so that one end of the cleaning blade is in contact with the surface of the photosensitive drum 30A. Residual K-toner remaining on the surface of the photosensitive drum 30A is scraped off by the cleaning blade in accordance with the rotation of the photosensitive drum 30A, and collected inside the cleaning case 31A.

The photosensitive drums 30B, 30C, and 30D have the same configuration as the photosensitive drum 30A. The photosensitive drums 30B, 30C, and 30D are arranged on the positive X-axis side of the photosensitive drum 30A in this order with keeping a predetermined distance from the adjacent ones. In the same manner as a positional relation between the charging unit 32A, the toner cartridge 33A, and the cleaning case 31A and the photosensitive drum 30A, charging units 32B, 32C, and 32D, toner cartridges 33B, 33C, and 33D, and cleaning cases 31B, 31C, and 31D are arranged around the photosensitive drums 30B, 30C, and 30D, respectively.

The charging units 32B, 32C, and 32D have the same configuration as the charging unit 32A, and charge the surfaces of the photosensitive drums 30B, 30C, and 30D at a predetermined voltage.

The toner cartridges 33B, 33C, and 33D respectively include a cartridge main body filled with the corresponding one of C, M, and Y-toners and a developing roller charged at a voltage of a polarity opposite to that of the photosensitive drums 30B, 30C, and 30D. The C, M, and Y-toners filled in the cartridge main bodies are supplied to the surfaces of the photosensitive drums 30B, 30C, and 30D via the developing rollers, respectively.

The cleaning cases 31B, 31C, and 31D have the same configuration as the cleaning case 31A, and function in the same manner as the cleaning case 31A.

Hereinafter, the photosensitive drum 30A, the charging unit 32A, the toner cartridge 33A, and the cleaning case 31A are all together referred to as a first station. Likewise, the photosensitive drum 30B, the charging unit 32B, the toner cartridge 33B, and the cleaning case 31B are all together referred to as a second station. The photosensitive drum 30C, the charging unit 32C, the toner cartridge 33C, and the cleaning case 31C are all together referred to as a third station. The photosensitive drum 30D, the charging unit 32D, the toner cartridge 33D, and the cleaning case 31D are all together referred to as a fourth station.

The transfer belt 40 is an endless loop belt, and is supported by driven rollers 40a and 40c and a drive roller 40b. The driven rollers 40a and 40c are arranged below the photosensitive drums 30A and 30D, respectively. The drive roller 40b is arranged at a position slightly lower than the driven rollers 40a and 40c. The transfer belt 40 is arranged so that an upper tense surface of the transfer belt 40 is in contact with bottom portions of the surfaces of the photosensitive drums 30A to 30D. The drive roller 40b rotates counterclockwise in FIG. 1, and thereby causing the transfer belt 40 to rotate counterclockwise (in a direction of arrows shown in FIG. 1). Furthermore, a transfer charging unit 48 is arranged near an end portion of the transfer belt 40 on the positive X-axis side. A voltage of a polarity opposite to that of the charging units 32A to 32D is applied to the transfer charging unit 48.

The sheet feed tray 60 is arranged below the transfer belt 40. The sheet feed tray 60 is a substantially rectangular solid tray, and contains therein a stack of sheets 61 as paper for printing. A rectangular feed opening is formed near an end portion of a top surface of the sheet feed tray 60 on the positive X-axis side.

The sheet feed roller 54 picks up a top sheet of the sheets 61 one by one from the sheet feed tray 60, and feeds the sheet 61 to a clearance formed between the transfer belt 40 and the transfer charging unit 48 via the first registration rollers 56.

The fixing rollers 50 apply heat and pressure to the sheet 61 while the sheet 61 is passing through a nip portion formed between the fixing rollers 50, and convey the sheet 61 to the sheet discharging rollers 58 via the second registration rollers 52.

The sheet discharging rollers 58 stack the sheets 61 conveyed from the second registration rollers 52 sequentially on the sheet discharge tray 501a.

Figure 2:
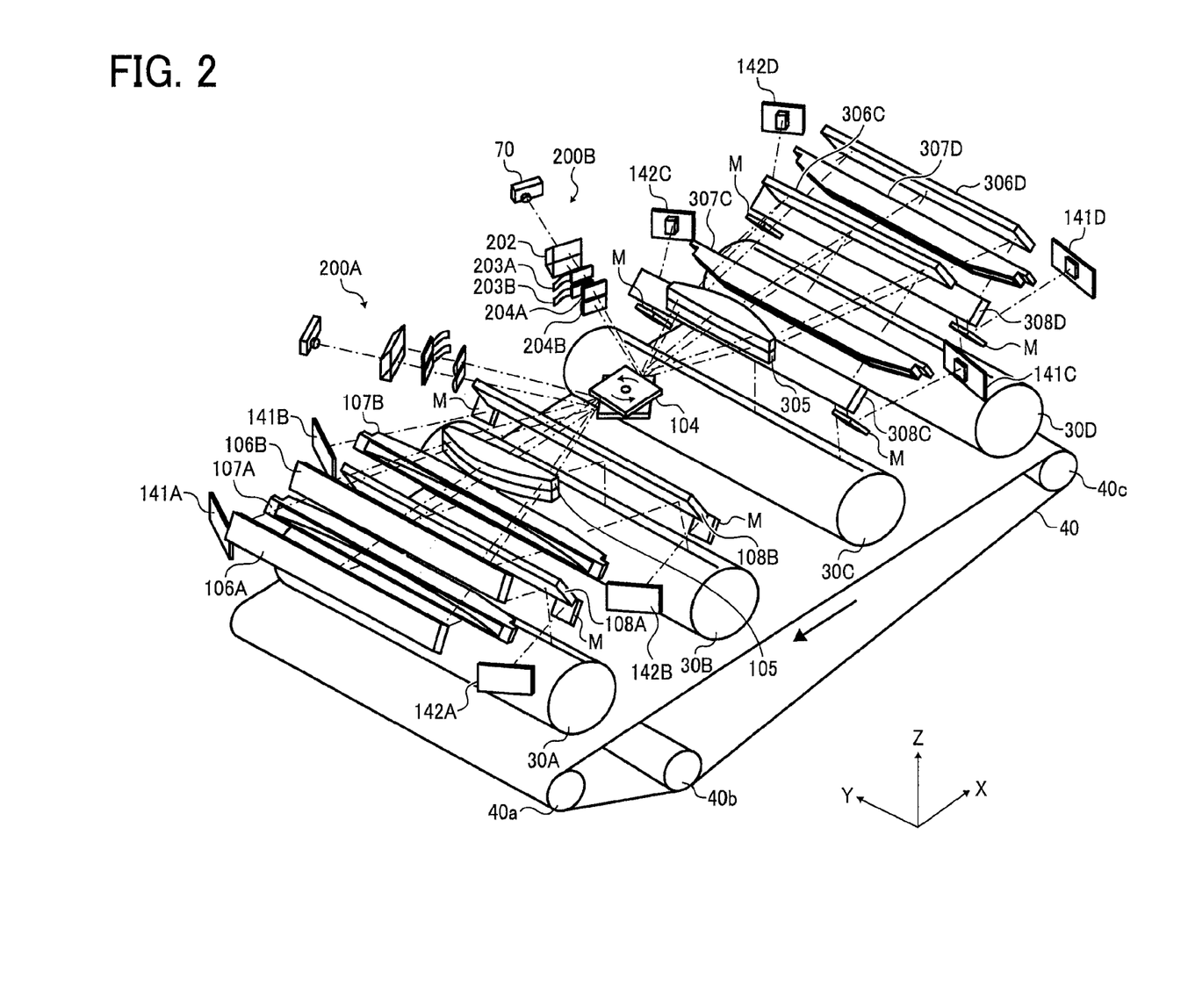
FIG. 2 is a perspective view of an optical scanning device of the image forming apparatus shown in FIG. 1.
Figure 3:
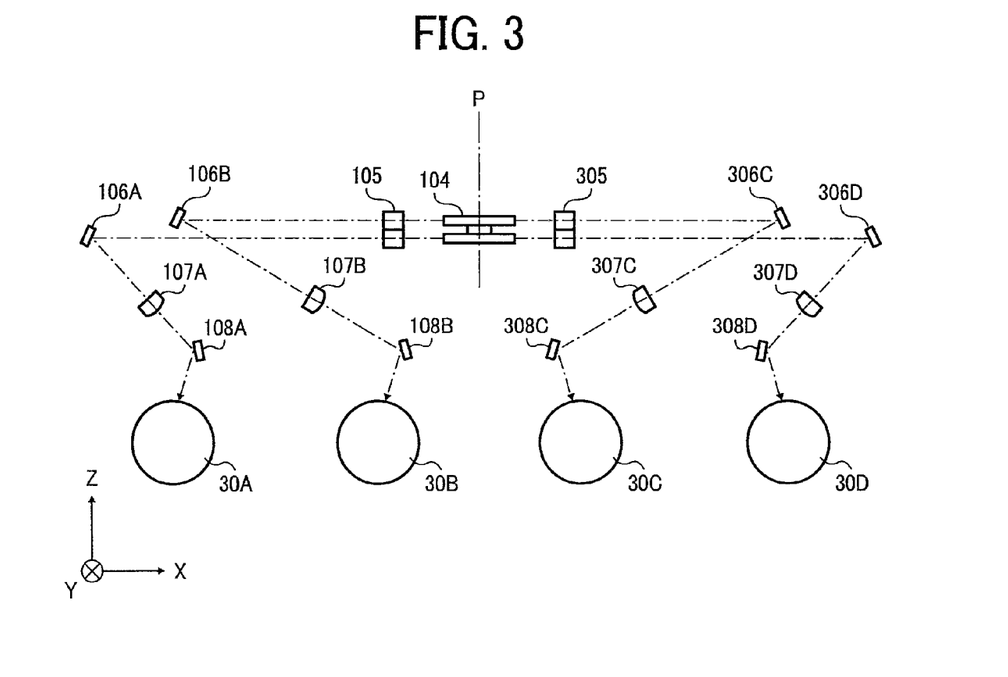
FIG. 3 is a side view of the optical scanning device.

The configuration of the optical scanning device 100 is explained in detail below. FIG. 2 is a perspective view of the optical scanning device 100. FIG. 3 is a side view of the optical scanning device 100. As shown in FIGS. 2 and 3, the optical scanning device 100 includes a scanning optical system and two optical systems 200A and 200B. The scanning optical system includes a polygon mirror 104, f-theta lenses 105 and 305, reflecting mirrors 106A, 106B, 306C, 306D, 108A, 108B, 308C, and 308D, and toroidal lenses 107A, 107B, 307C, and 307D. The f-theta lens 105 and the reflecting mirrors 106B and 106A are arranged in a negative X-axis direction of the polygon mirror 104 in this order. The reflecting minor 108B is arranged below the f-theta lens 105. The toroidal lens 107B, the reflecting mirror 108A, and the toroidal lens 107A are arranged in the negative X-axis direction of the reflecting mirror 108B in this order. The f-theta lens 305 and the reflecting mirrors 306C and 306D are arranged in a positive X-axis direction of the polygon mirror 104 in this order. The reflecting mirror 308C is arranged below the f-theta lens 305. The toroidal lens 307C, the reflecting mirror 308D, and the toroidal lens 307D are arranged in the positive X-axis direction of the reflecting mirror 308C in this order. The optical system 200A lets laser beams for scanning the photosensitive drums 30A and 30B enter the polygon mirror 104. The optical system 20013 lets laser beams for scanning the photosensitive drums 30C and 30D enter the polygon mirror 104.

The optical systems 200A and 200B let the laser beams enter deflecting surfaces of the polygon mirror 104 from a direction at an angle of 120 degrees or 60 degrees with respect to the X-axis. As shown in FIG. 2, although reference numerals of elements of the optical system 200A are omitted, each of the optical systems 200A and 200B includes a light source device 70, a flux splitting prism 202, a pair of liquid crystal elements 203A and 203B, and a pair of cylindrical lenses 204A and 204B. The flux splitting prism 202, the liquid crystal elements 203A and 203B, and the cylindrical lenses 204A and 204B are arranged in this order along a path of a laser beam emitted from the light source device 70. For convenience of explanation, a coordinate system obtained by rotating X, Y coordinates by 30 degrees around the Z-axis is defined as an x-y-z coordinate system.

Figure 4:
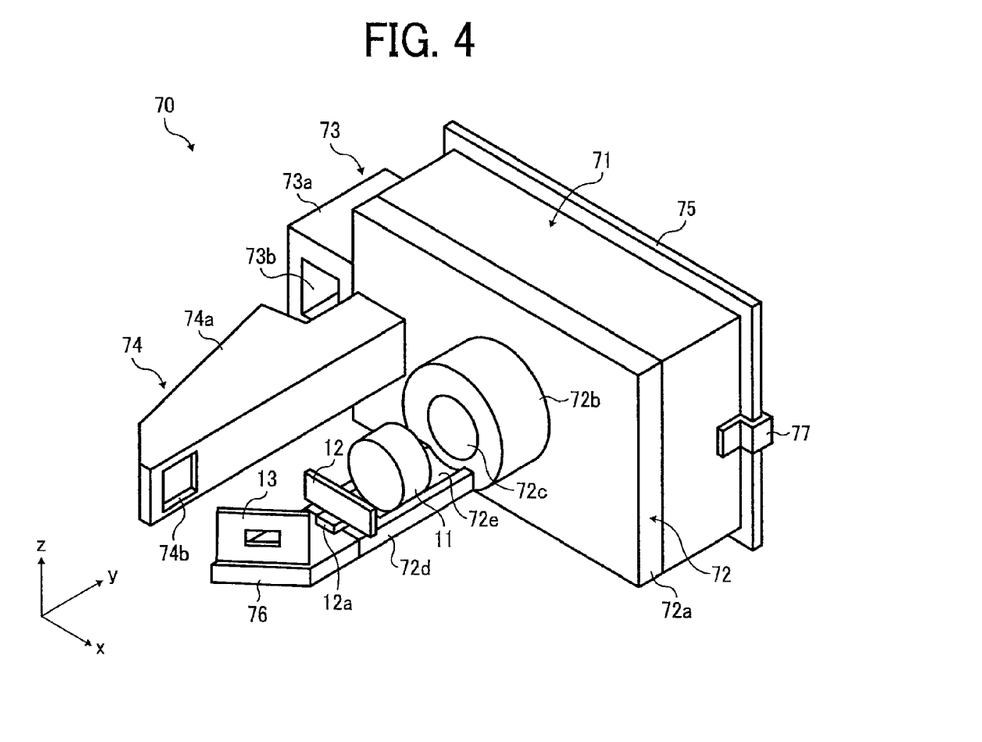
FIG. 4 is a perspective view of a light source device of the optical scanning device shown in FIG. 2.
Figure 5:
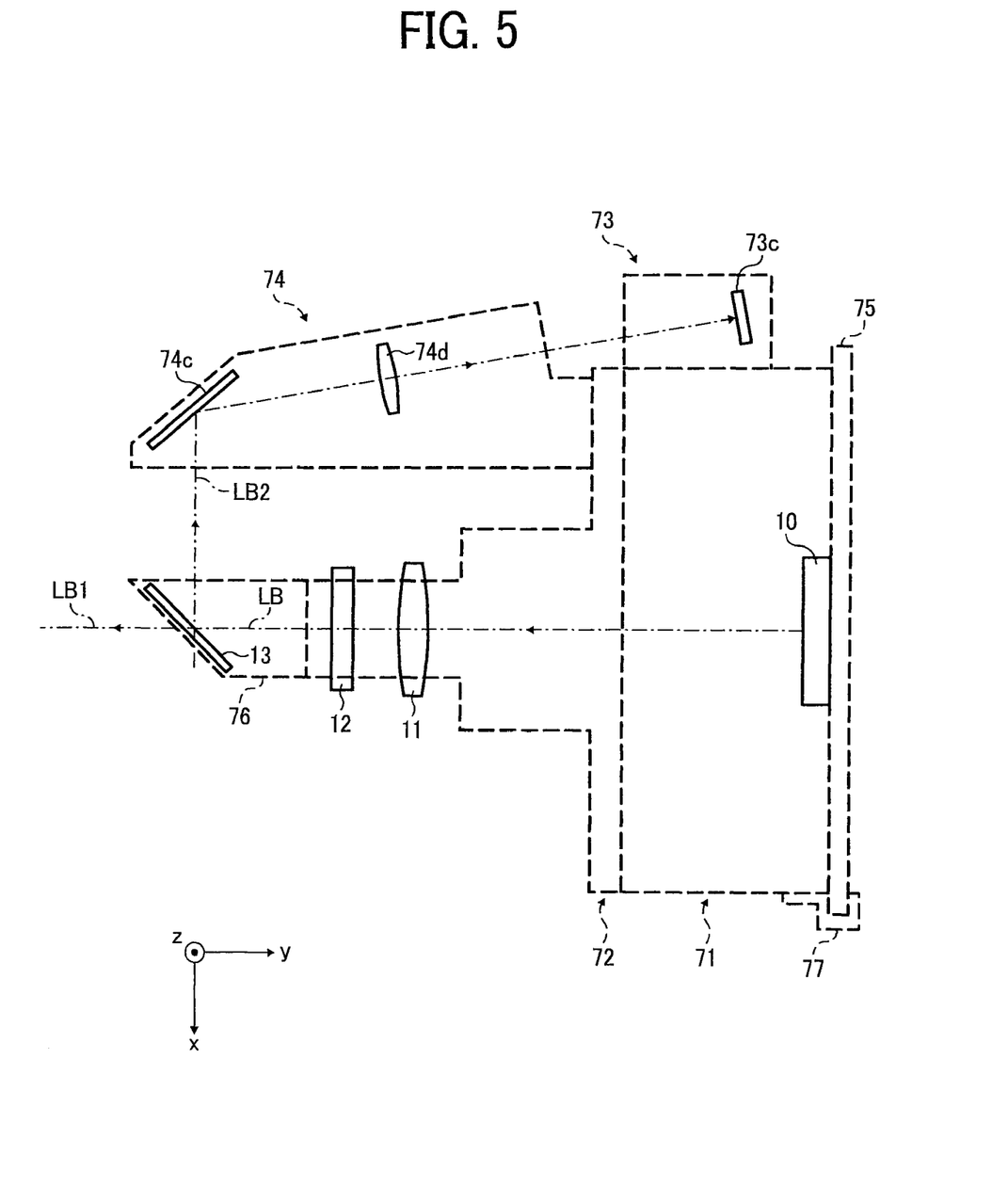
FIG. 5 is a schematic diagram for explaining a layout of a light source and optical elements in the light source device.

FIG. 4 is a perspective view of the light source device 70. FIG. 5 is a schematic diagram for explaining a layout of a light source 10 and optical elements included in the light source device 70. As shown in FIGS. 4 and 5, the light source device 70 further includes a substrate 75, a first holder 71, a second holder 72, an input optical system 74, and a light-receiving unit 73. The light source 10 is mounted on the substrate 75. The first holder 71 holds the substrate 75. The second holder 72 holds a coupling lens 11, a temperature compensating lens 12, and a splitting optical element 13 as the optical elements. The input optical system 74 is attached to the second holder 72. The light-receiving unit 73 receives a laser beam from the input optical system 74.

Figure 6:
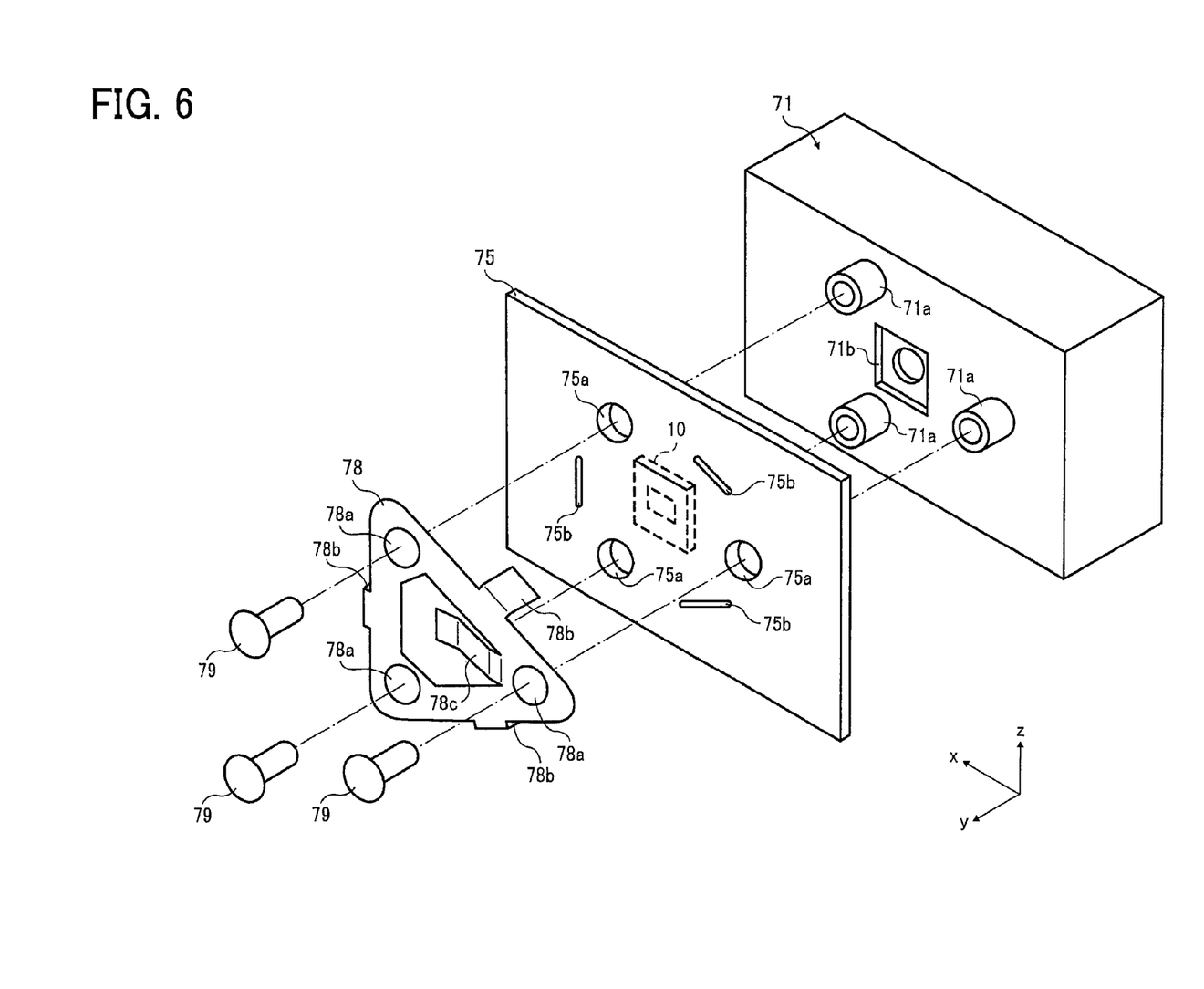
FIG. 6 is an exploded perspective view of a substrate and a first holder of the light source device.

FIG. 6 is an exploded perspective view of the substrate 75 and the first holder 71. As shown in FIG. 6, a long side of the substrate 75 is oriented in an x-axis direction. The light source 10 is mounted on the negative y-axis side of the substrate 75. A drive circuit for driving the light source 10 and the like are provided on the positive y-axis side of the substrate 75. Three circular holes 75a and three slits 75b are formed on the substrate 75 so as to encircle the light source 10.

Figure 7A:
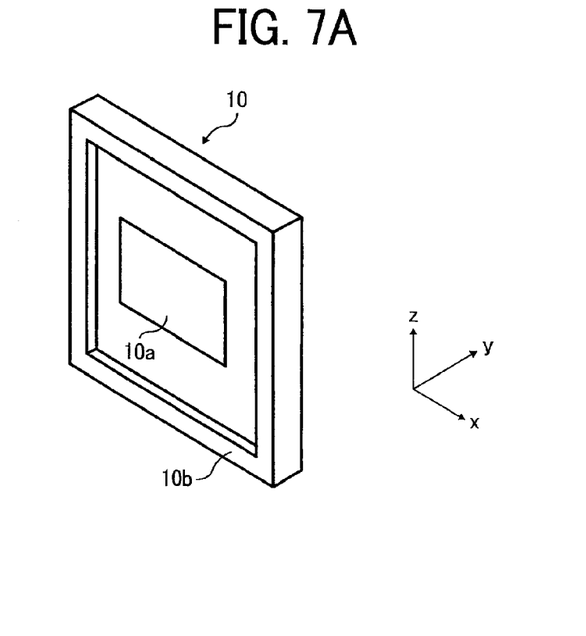
FIG. 7A is a perspective view of the light source.

FIG. 7A is a perspective view of the light source 10. As shown in FIG. 7A, the light source 10 is a surface-emitting laser array, and includes a square plate-like package 10b and a light-emitting unit 10a. The light-emitting unit 10a is contained in the package 10b.

The package 10b is composed of a case and a glass plate. The case is made of, for example, ceramic, and has a U-shape in both an x-y cross-section and a z-y cross-section. The glass plate has the same size as the case, and is attached onto the negative y-axis side of the case. Inside the package 10b is filled with inert gas.

Figure 7B:
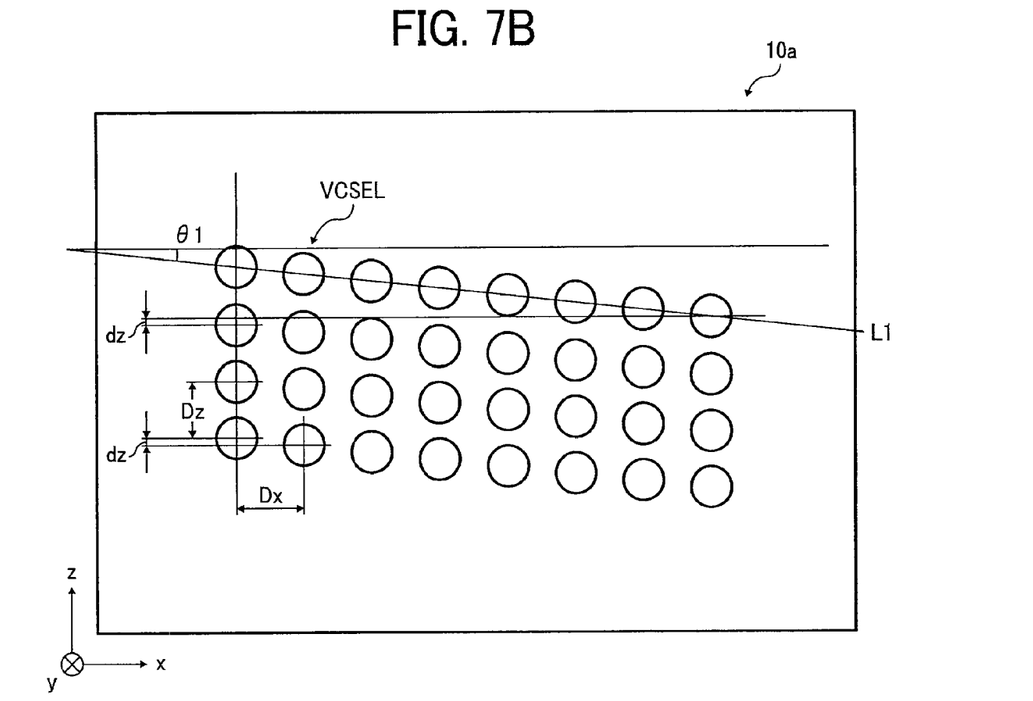
FIG. 7B is a plane view of light-emitting units of the light source shown in FIG. 7A.

The light-emitting unit 10a is an element having a light-emitting face on which a plurality of VCSELs are two-dimensionally arrayed. As shown in FIG. 7B, thirty-two VCSELs, which respectively emit a divergent light in a negative y-axis direction, are arrayed on the light-emitting face (the negative y-axis side) of the light-emitting unit 10a in a matrix of four rows and eight columns if a direction parallel to a straight line L1 extending at an angle of θ1 to the x-axis is referred to as a row direction and a direction parallel to the z-axis is referred to as a column direction. In the present embodiment, as one example, a distance Dz between the VCSELs in a sub-scanning direction is 18.4 micrometers (μm), a distance Dx between the VCSELs in a main scanning direction is 30 μm, and a distance dz between adjacent light-emitting sources of each of the VCSELs in a z-axis direction (i.e., in the sub-scanning direction) is 2.3 μm (=Dz/8). The light-emitting unit 10a is contained inside the package 10b in a state where the light-emitting face is parallel to the negative y-axis side of the package 10b.

As shown in FIGS. 4, 5, and 6, the first holder 71 has a shape of a rectangular solid that the negative y-axis side of which is opened, and a rectangular concave portion 71b and three tubular portions 71a are formed on the positive y-axis side thereof. The light source 10 mounted on the substrate 75 is fitted in the concave portion 71b. The tubular portions 71a are formed on the first holder 71 so as to encircle the concave portion 71b. The tubular portions 71a are inserted into the circular holes 75a formed on the substrate 75, respectively. A circular opening leading to inside the first holder 71 is formed on a bottom wall surface of the concave portion 71b.

As shown in FIG. 6, after the substrate 75 and the first holder 71 are fitted together in such a manner that the light source 10 mounted on the substrate 75 is fitted in the concave portion 71b formed on the first holder 71, and the three tubular portions 71a formed on the first holder 71 are inserted into the three circular holes 75a formed on the substrate 75, a substantially triangular biasing member 78 is attached to the tubular portions 71a, whereby relative positions of the substrate 75 and the first holder 71 are defined.

The biasing member 78 is made of, for example, an elastic plate-like member. The elastic plate-like member is processed by sheet metal working, and three circular holes 78a, three anchor portions 78b, and a pressing portion 78c are formed on the biasing member 78. The circular holes 78a are formed on corner portions of the biasing member 78, respectively. The anchor portions 78b are inserted into the three slits 75b formed on the substrate 75, respectively. The pressing portion 78c exerts an elastic force in the negative y-axis direction. In a state where the anchor portions 78b are inserted into the slits 75b of the substrate 75, the biasing member 78 is threadably mounted on the first holder 71 by screwing three screws 79 in the tubular portions 71a of the first holder 71 via the circular holes 78a. Therefore, the substrate 75 is biased in a direction of coming close to the first holder 71 by the pressing portion 78c of the biasing member 78, and thus the negative y-axis side of the light source 10 is pressed against the bottom wall surface of the concave portion 71b formed on the first holder 71.

Furthermore, relative positions of the substrate 75 and the first holder 71 that are integrated with each other as described above are maintained constant by a holding member 77. As shown in FIG. 4, the holding member 77 includes a plate-like fixed portion and a U-shaped grip portion. The fixed portion is fixed on the positive x-axis side of the first holder 71. The grip portion is formed on the positive y-axis side of the holding member 77. The holding member 77 is attached to the first holder 71 in such a manner that the fixed portion is fixed on the first holder 71 in a state where the grip portion grips on the substrate 75.

The second holder 72 includes, as shown in FIG. 4, a plate-like main body portion 72a, a ring-like convex portion 72b, and a projecting portion 72d. A circular opening 72c is formed in the center of the main body portion 72a. The ring-like convex portion 72b is formed on the negative y-axis side of the main body portion 72a so as to encircle the circular opening 72c. The projecting portion 72d projects in the negative y-axis direction from a lower part of the ring-like convex portion 72b. A concave portion 72e is provided on an upper surface of the projecting portion 72d. The concave portion 72e is curved around a y-axis direction as a generatrix. The positive y-axis side of the main body portion 72a is fixed to the first holder 71 in a state where the circular opening 72c is located on the positive y-axis side of the light source 10.

The coupling lens 11 is arranged on the upper surface of the projecting portion 72d of the second holder 72. The coupling lens 11 is, for example, the one that has a refractive index of about 1.5 and a focal point is on the negative y-axis side. The coupling lens 11 changes a divergence angle of an incident laser beam, and thereby shaping the laser beam into a substantially parallel light.

The temperature compensating lens 12 is arranged on an end portion of the upper surface of the projecting portion 72d, which is formed on the second holder 72 so that a long side of the temperature compensating lens 12 is oriented in the x-axis direction, on the negative y-axis side via a third holder 12a. The temperature compensating lens 12 is made of transparent resin, and is a rectangular plate-like plastic lens that a long side of which is oriented in the x-axis direction. As optical characteristics of the temperature compensating lens 12, the temperature compensating lens 12 changes shape so as to compensate for a fluctuation in optical characteristics of the light source device 70 caused by, for example, a microscopic fluctuation in a distance between the coupling lens 11 and the light source 10 in accordance with a temperature fluctuation of the light source device 70.

Figure 8:
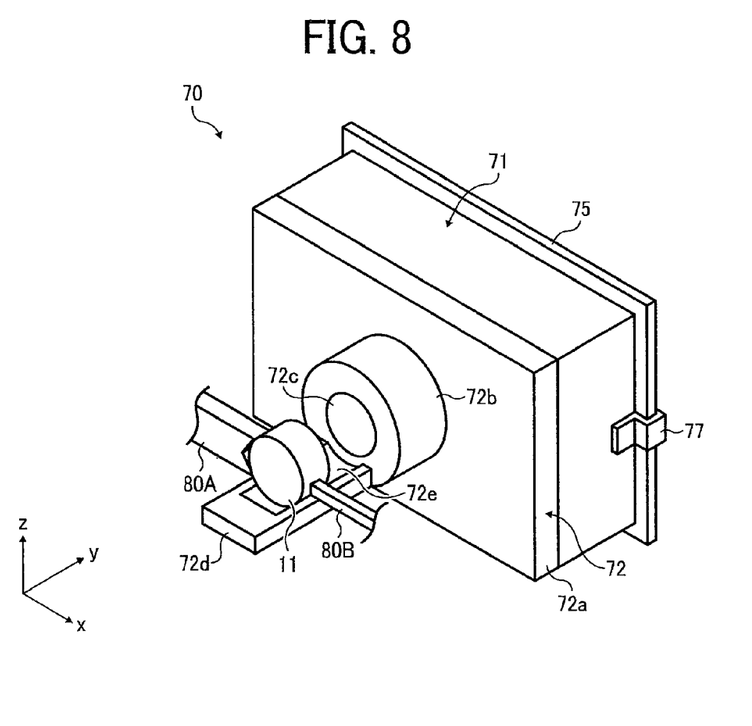
FIG. 8 is a schematic diagram for explaining how a coupling lens is mounted.
Figure 9:
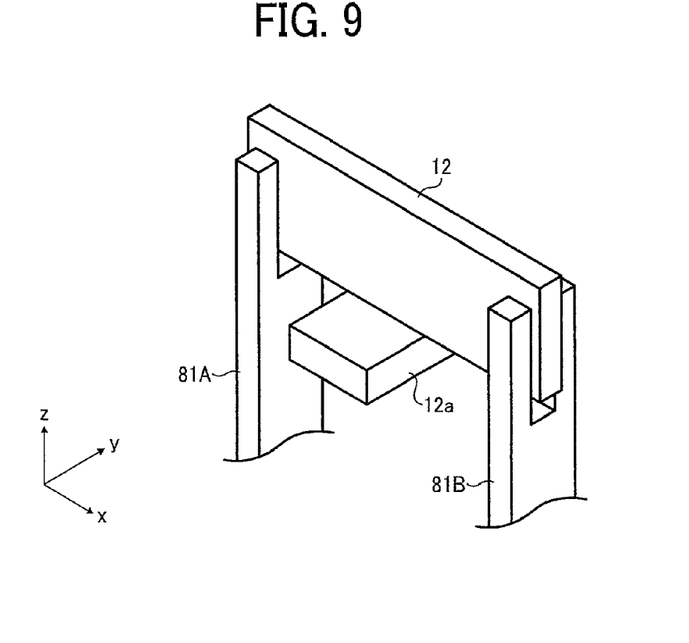
FIG. 9 is a schematic diagram for explaining how a temperature compensating lens is mounted.

A procedure of mounting the coupling lens 11 and the temperature compensating lens 12 is explained below. When the coupling lens 11 and the temperature compensating lens 12 are mounted in the second holder 72 and the third holder 12a respectively, first, the coupling lens 11 is grasped by a fixture 80A having a V-shaped tip and a rod-like fixture 80B as shown in FIG. 8, and the temperature compensating lens 12 is grasped by a pair of fixtures 81A and 81B as shown in FIG. 9. Then, the coupling lens 11 and the temperature compensating lens 12 are positioned in a relative manner.

Next, an ultraviolet (UV) curing adhesive agent is applied to an upper surface of each of the projecting portion 72d and the third holder 12a, and the position and the posture of the coupling lens 11 are adjusted by moving both the coupling lens 11 and the temperature compensating lens 12 in any of the x-axis direction, the y-axis direction, and the z-axis direction while maintaining relative positions of the coupling lens 11 and the temperature compensating lens 12 so that an optical axis of the coupling lens 11 coincides with the center of the light source 10.

After that, the UV curing adhesive agent is irradiated with UV thereby being cured, and the coupling lens 11 and the temperature compensating lens 12 are adhered to the second holder 72 and the third holder 12a respectively. In the present embodiment, a curvature of an outer edge portion of the coupling lens 11 and a curvature of the concave portion 72e formed on the upper surface of the projecting portion 72d are set to be about the same, so that the coupling lens 11 can be firmly adhered to the projecting portion 72d.

As shown in FIG. 4, the splitting optical element 13 is a plate-like member on which a rectangular opening that a long side of which is oriented in the x-axis direction is formed in the center thereof. A reflecting surface for reflecting a laser beam is formed on the positive y-side of the splitting optical element 13. The splitting optical element 13 is arranged so that the center of the opening is located on or near the focal position of the coupling lens 11, and supported by a fourth holder 76 fixed to an end portion of the projecting portion 72d on the negative y-axis side in a state where the reflecting surface is tilted at 45 degrees to a zx plane.

As shown in FIG. 5, a laser beam LB passing through the coupling lens 11 and the temperature compensating lens 12 is split into a laser beam LB1 for scanning and a laser beam LB2 for monitoring by the splitting optical element 13 in such a manner that a luminous flux including a principal ray (the laser beam LB1 for scanning) passes through the opening of the splitting optical element 13 and a luminous flux (the laser beam LB2 for monitoring) is reflected in the negative x-axis direction by the reflecting surface of the splitting optical element 13.

Figure 10:
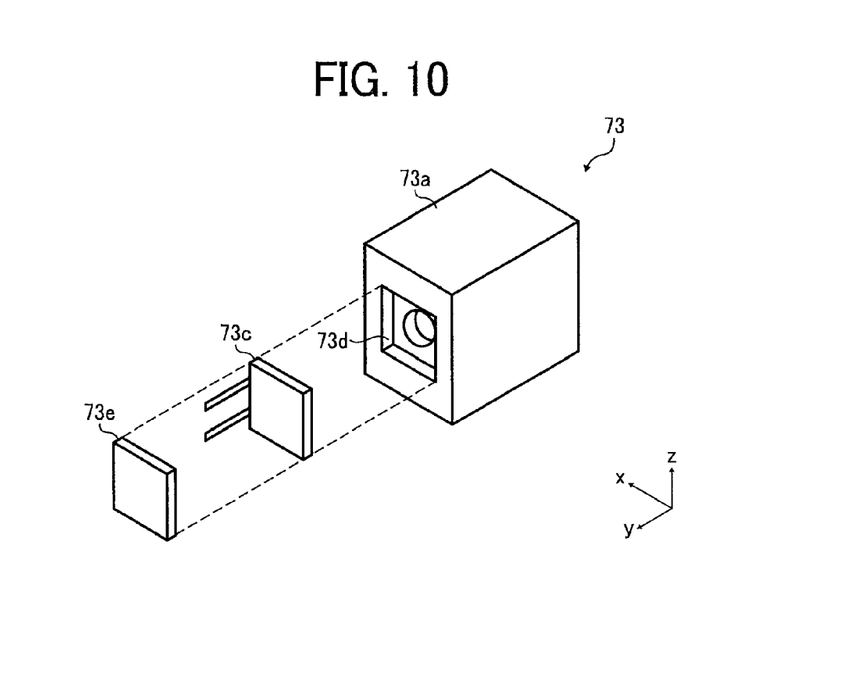
FIG. 10 is an exploded perspective view of a light-receiving unit of the light source device shown in FIG. 4.

FIG. 10 is an exploded perspective view of the light-receiving unit 73. As shown in FIGS. 10 and 4, the light-receiving unit 73 includes a case 73a and a square plate-like light-receiving element 73c. A long side of the case 73a in the y-axis direction is fixed on the negative x-axis side of the first holder 71. The light-receiving element 73c is arranged inside the case 73a.

The case 73a is a hollow member. An opening 73b is formed on a surface of the case 73a on the negative y-axis side, and a rectangular concave portion 73d is formed on an outer wall surface of the case 73a on the positive y-axis side. A dimension of the rectangular concave portion 73d is defined to be about the same as that of the light-receiving element 73c. As shown in FIG. 10, the light-receiving element 73c is attached to the case 73a in such a manner that the light-receiving element 73c is inserted into the concave portion 73d in a state where a pair of lead terminals of the light-receiving element 73c protrudes in the negative y-axis direction, and a cover member 73e is fitted in the concave portion 73d. A circular through-hole leading to inside the case 73a is formed on a bottom wall surface of the concave portion 73d. An incident laser beam from the opening 73b of the case 73a is emitted to the light-receiving element 73c via the through-hole. Incidentally, in the present embodiment, the bottom wall surface of the concave portion 73d is tilted with respect to the zx plane, and the light-receiving element 73c is, as shown in FIG. 5, arranged so that a light-receiving surface of which is at right angle to a path of the incident laser beam from the opening 73b. When the laser beam is emitted to the light-receiving element 73c, a light-source conversion signal depending on an intensity of the emitted laser beam is output via the lead terminals.

As shown in FIGS. 4 and 5, the input optical system 74 is provided on the negative x-axis side of the projecting portion 72d formed on the second holder 72. The input optical system 74 includes a casing 74a, a reflecting mirror 74c, and a collective lens 74d. A long side of the casing 74a is oriented in the y-axis direction. The reflecting mirror 74c and the collective lens 74d are held inside the casing 74a.

The casing 74a is a hollow member that a dimension in the x-axis direction from an end portion on the negative y-axis side to a center portion slightly-shifted on the positive y-axis side is gradually increased. An opening 74b is formed on the positive x-axis side of the casing 74a. The laser beam LB2 for monitoring reflected by the splitting optical element 13 enters the input optical system 74 through the opening 74b. As shown in FIG. 5, the laser beam LB2 for monitoring travelling from the opening 74b to inside the casing 74a is reflected in the positive y-axis direction by the reflecting mirror 74c, and enters the collective lens 74d. After that, the laser beam LB2 for monitoring is collected by the collective lens 74d, and emitted to the light-receiving element 73c via an opening (not shown) formed on the casing 74a and the opening 73b formed on the light-receiving unit 73.

Figure 11:
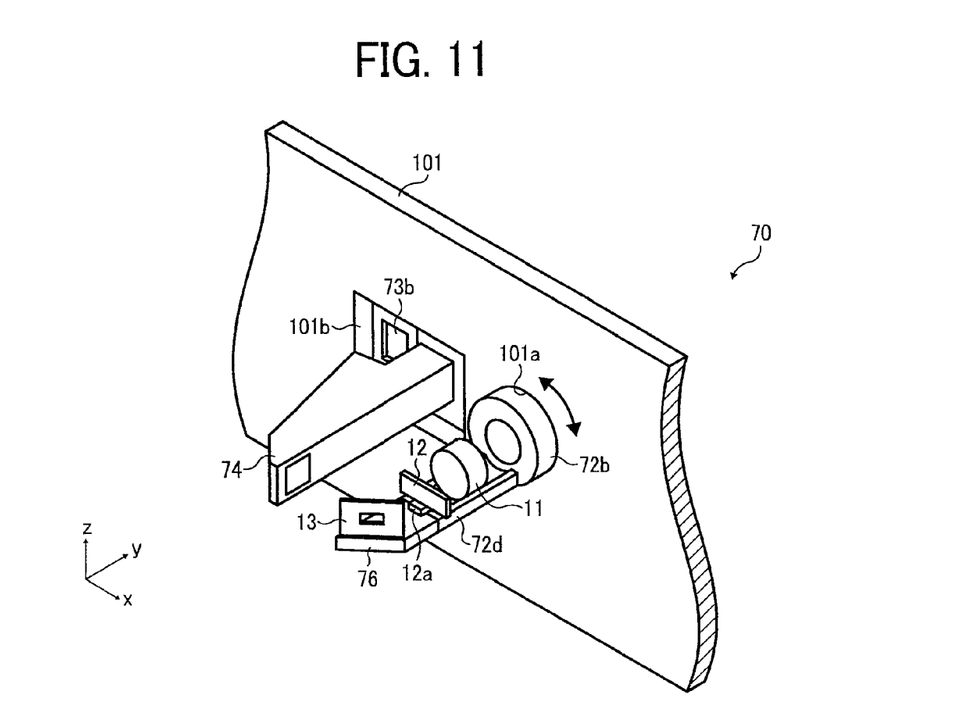
FIG. 11 is a perspective view of the light source device mounted on an optical housing of the optical scanning device.

The light source device 70 configured as described above is rotatably attached to an optical housing 101 of the optical scanning device 100 so that the light source device 70 can rotate around an axis substantially parallel to the optical axis of the coupling lens 11. In the present embodiment, in the optical housing 101, as shown in FIG. 11, a circular fitted portion 101a penetrating the optical housing 101 in the y-axis direction is formed, and a rectangular inserted portion 101b penetrating the optical housing 101 in the y-axis direction is formed on the negative x-axis side of the fitted portion 101a. An inner diameter of the fitted portion 101a is defined to be equal to an outer diameter of the ring-like convex portion 72b formed on the second holder 72. Dimensions of the inserted portion 101b in the z-axis direction and the x-axis direction are defined to be sufficiently larger than dimensions of the casing 74a of the input optical system 74 in the z-axis direction and the x-axis direction.

The light source device 70 is rotatably attached to the optical housing 101 so that the light source device 70 can rotate around the axis substantially parallel to the optical axis of the coupling lens 11 in such a manner that the ring-like convex portion 72b of the second holder 72 is fitted into the fitted portion 101a in a state where the input optical system 74 is inserted into the inserted portion 101b from the positive y-axis side thereof. Therefore, the pitch in the sub-scanning direction of a laser beam collected on each of the photosensitive drums 30A to 30D can be adjusted by rotating the light source device 70 in a direction of an arrow shown in FIG. 11. Furthermore, in this state, the opening 73b of the light-receiving unit 73 is exposed via the inserted portion 101b.

To return to FIG. 2, the flux splitting prism 202 splits the incident laser beam into two laser beams one above the other, i.e., in a vertical direction (the sub-scanning direction) at a predetermined distance from each other.

The liquid crystal elements 203A and 203B are arranged adjacently one above the other so as to respond to the two laser beams into which the laser beam is split by the flux splitting prism 202, and respectively deflect the corresponding laser beam in the sub-scanning direction depending on a voltage signal received from the control unit (not shown).

The cylindrical lenses 204A and 204B are arranged adjacently one above the other so as to respond to the two laser beams into which the laser beam is split by the flux splitting prism 202, and respectively focus the incident laser beam on the polygon mirror 104. Incidentally, the cylindrical lenses 204A and 204B are at least positively curved in the sub-scanning direction, and compose an optical face tangle error correcting optical system for making a conjugate relation between a deflection point on the polygon mirror 104 and the surface of each of the photosensitive drums 30A to 30D in the sub-scanning direction together with the toroidal lenses 107A, 107B, 307C, and 307D.

The polygon mirror 104 is composed of a pair of square prism-like members that a deflecting surface for deflecting a laser beam is formed on each side surface thereof. The square prism-like members are arranged adjacently one above the other to be shifted by a phase difference of 45 degrees between them. The polygon mirror 104 is rotated in a direction of arrows shown in FIG. 2 at a constant angular velocity by a rotating mechanism (not shown). Therefore, two laser beams into which a laser beam is split by the flux splitting prism 202 of any of the optical systems 200A and 200B are collected on the upper and lower deflecting surfaces of the polygon mirror 104 respectively, and deflected by the deflecting surfaces that differ in phase. Thus, the two laser beams are alternately emitted to the photosensitive drums, respectively.

The f-theta lenses 105 and 305 have an image height proportional to an incidence angle of a laser beam. The f-theta lenses 105 and 305 move an image plane of the laser beam deflected at the constant angular velocity by the polygon mirror 104 to the Y-axis at the constant speed.

A long side of each of the reflecting mirrors 106A, 106B, 306C, and 306D is oriented in the Y-axis direction. The reflecting mirrors 106A, 106B, 306C, and 306D reflect the laser beams passing through the f-theta lenses 105 and 305 to enter the toroidal lenses 107A, 107B, 307C, and 307D, respectively.

The toroidal lenses 107A, 107B, 307C, and 307D are arranged so that a long side of which is oriented in the Y-axis direction. The toroidal lenses 107A, 107B, 307C, and 307D collect the laser beams reflected by the reflecting mirrors 106A, 106B, 306C, and 306D on the surfaces of the photosensitive drums 30A, 30B, 30C, and 30D via the reflecting mirrors 108A, 108B, 308C, and 308D that a long side of which is oriented in the Y-axis direction.

Light detecting sensors 141A and 141B are arranged near end portions of the toroidal lenses 107A and 107B on the positive Y-axis side (on the entrance side of the laser beams), respectively. Light detecting sensors 141C and 141D are arranged near end portions of the toroidal lenses 307C and 307D on the negative Y-axis side (on the entrance side of the laser beams), respectively. Furthermore, light detecting sensors 142A and 142B are arranged near end portions of the toroidal lenses 107A and 107B on the negative Y-axis side, respectively. Light detecting sensors 142C and 142D are arranged near end portions of the toroidal lenses 307C and 307D on the positive Y-axis side, respectively. The light detecting sensors 141A to 141D and 142A to 142D respectively output a signal, for example, so as to be turned on while the laser beam is emitted and turned off in the rest of the time.

Subsequently, the operation of the image forming apparatus 500 including the optical scanning device 100 configured as described above is explained below. When the image forming apparatus 500 receives image data from a higher-level device, a laser beam emitted from the light source device 70 of the optical system 200A is split into two laser beams one above the other by the flux splitting prism 202. The upper and lower laser beams pass through the liquid crystal elements 203A and 203B respectively, whereby positions of the laser beams in the sub-scanning direction are corrected. After that, the laser beams are collected on the deflecting surfaces of the polygon mirror 104 by the cylindrical lenses 204A and 204B respectively. The laser beams deflected by the polygon mirror 104 enter the f-theta lens 105.

The upper laser beam passing through the f-theta lens 105 is reflected by the reflecting mirror 106B, and enters the toroidal lens 107B. After that, the upper laser beam is collected on the surface of the photosensitive drum 30B via the reflecting mirror 108B by the toroidal lens 107B. The lower laser beam passing through the f-theta lens 105 is reflected by the reflecting mirror 106A, and enters the toroidal lens 107A. After that, the lower laser beam is collected on the surface of the photosensitive drum 30A via the reflecting mirror 108A by the toroidal lens 107A. Incidentally, as described above, the polygon mirror 104 has the upper and lower deflecting surfaces having the phase difference of 45 degrees between them. Therefore, the upper laser beam for scanning the photosensitive drum 30B and the lower laser beam for scanning the photosensitive drum 30A are alternately emitted to the negative Y-axis direction based on signals output from the light detecting sensors 141A, 141B, 142A, and 142B.

On the other hand, a laser beam emitted from the light source device 70 of the optical system 200B is split into two laser beams one above the other by the flux splitting prism 202. The upper and lower laser beams pass through the liquid crystal elements 203A and 203B respectively, whereby positions of the laser beams in the sub-scanning direction are corrected. After that, the laser beams are collected on the deflecting surfaces of the polygon mirror 104 by the cylindrical lenses 204A and 204B respectively. The laser beams deflected by the polygon mirror 104 enter the f-theta lens 305.

The upper laser beam passing through the f-theta lens 305 is reflected by the reflecting mirror 306C, and enters the toroidal lens 307C. After that, the upper laser beam is collected on the surface of the photosensitive drum 30C via the reflecting mirror 308C by the toroidal lens 307C. The lower laser beam passing through the f-theta lens 305 is reflected by the reflecting mirror 306D, and enters the toroidal lens 307D. After that, the lower laser beam is collected on the surface of the photosensitive drum 30D via the reflecting mirror 308D by the toroidal lens 307D. Incidentally, as described above, the polygon mirror 104 has the upper and lower deflecting surfaces having the phase difference of 45 degrees between them. Therefore, the upper laser beam for scanning the photosensitive drum 30C and the lower laser beam for scanning the photosensitive drum 30D are alternately emitted to the positive Y-axis direction based on signals output from the light detecting sensors 141C, 141D, 142C, and 142D.

Furthermore, in the light source device 70, as shown in FIG. 5, the laser beam LB2 for monitoring, which is emitted from the light source 10 and reflected by the reflecting surface of the splitting optical element 13, is emitted to the light-receiving element 73c of the light-receiving unit 73. The light source device 70 constantly monitors a signal output when a laser beam is emitted to the light-receiving element 73c, and controls an intensity of a laser beam to be emitted from the light source 10.

Specifically, the light-receiving element 73c receives the laser beam LB2 for monitoring while the laser beam reaches a writing area of the photosensitive drum after the laser beam is deflected by the deflecting surface of the polygon mirror 104. The light source device 70 detects an intensity of the laser beam emitted from the light source 10 based on a photoelectric conversion signal output from the light-receiving element 73c upon receipt of the laser beam LB2 for monitoring, and sets (determines) a value of injected power to be supplied to each of the VCSELs so that an intensity of a laser beam to be emitted from the light source 10 becomes equal to a predetermined intensity. As a result, the laser beam adjusted to have the predetermined intensity is emitted to the writing area of each of the photosensitive drums 30A to 30D.

A photosensitive layer on the surface of each of the photosensitive drums 30A to 30D is charged at a predetermined voltage by each of the charging units 32A to 32D, whereby an electric charge is distributed at a constant charge density. After that, when each of the photosensitive drums 30A to 30D is exposed to the laser beam as described above, a portion of the photosensitive layer where the laser beam is collected has a conducting property, so that an electric potential in the portion becomes approximately zero. Therefore, the photosensitive drums 30A to 30D rotating in the direction of arrows shown in FIG. 1 are scanned by the laser beams modulated based on the image data, whereby electrostatic latent images defined by the charge distribution are formed on the surfaces of the photosensitive drums 30A to 30D, respectively.

When the electrostatic latent images are formed on the surfaces of the photosensitive drums 30A to 30D, K, C, M, and Y toners are supplied onto the surfaces of the photosensitive drums 30A to 30D by the developing rollers of the toner cartridges 33A to 33D, respectively. At this time, the developing rollers are charged at a voltage of a polarity opposite to that of the photosensitive drums 30A to 30D, so that the toners attached to the developing rollers are charged with the same polarity as the photosensitive drums 30A to 30D. Therefore, the toner is not attached to a portion where the electric charge is distributed, and is attached to only the portion scanned by the laser beam, whereby the electrostatic latent image is developed into a toner image. In this manner, K, C, M, and Y toner images are formed on the surfaces of the photosensitive drums 30A to 30D, respectively.

The K, C, M, and Y toner images formed in the first to fourth stations based on the image data are sequentially transferred onto the surface of the transfer belt 40 in a superimposed manner. The superimposed four-color toner image on the transfer belt 40 is further transferred onto a right side of the sheet 61 fed from the sheet feed tray 60 by the transfer charging unit 48, and fixed thereon by the fixing rollers 50. In this manner, a full-color image is formed on the sheet 61. The sheet 61 on which the full-color image is formed is discharged from the image forming apparatus 500 by the sheet discharging rollers 58, and stacked on the sheet discharge tray 501a sequentially.

As explained above, in the light source device 70 according to the present embodiment, the first holder 71, the third holder 12a, the fourth holder 76, and the input optical system 74 are attached to the rotatably-supported second holder 72, and the light-receiving unit 73 is fixed to the first holder 71. Therefore, the light source 10, the coupling lens 11, the temperature compensating lens 12, the splitting optical element 13, and the light-receiving element 73c are integrally held in the light source device 70. Consequently, when a position and an angle of the light source device 70 are adjusted, relative positions of the light source 10, the coupling lens 11, the temperature compensating lens 12, and the splitting optical element 13 and relative positions of the input optical system 74 and the light-receiving unit 73 do not fluctuate, and thus it is possible to adjust the pitch between scanning lines formed on the surface of each of the photosensitive drums 30A to 30D with accuracy.

Furthermore, in the light source device 70, the input optical system 74 is provided separately from the second holder 72. Therefore, when the coupling lens 11 and the temperature compensating lens 12 are attached, the input optical system 74 can be removed from the light source device 70. Thus, it is possible to position the coupling lens 11 and the temperature compensating lens 12 with high accuracy.

Moreover, in the light source device 70, the substrate 75 is biased to the first holder 71 by the biasing member 78, so that the surface of the light source 10, specifically, the negative y-axis side of the package 10b shown in FIG. 7A is pressed against the bottom wall surface of the concave portion 71b formed on the first holder 71 shown in FIG. 6. Therefore, it is possible to position the light source 10 with respect to the first holder 71 with accuracy. Furthermore, after relative positions of the substrate 75 and the first holder 71 are defined by the biasing member 78, the relative positions of the substrate 75 and the first holder 71 are maintained constant by the holding member 77.

Moreover, the biasing member 78 includes the anchor portions 78b that are inserted into the slits 75b formed on the substrate 75 when the biasing member 78 is fixed to the first holder 71. Therefore, it is possible to prevent a fluctuation in relative positions of the biasing member 78 and the substrate 75.

Furthermore, in the optical scanning device 100 according to the present embodiment, the light source device 70 is rotatably arranged so that the light source device 70 can rotate around the optical axis of the coupling lens 11. Therefore, it is possible to adjust the pitch of laser beams collected on the photosensitive drum in the sub-scanning direction to a predetermined pitch with accuracy.

Moreover, the image forming apparatus 500 according to the present embodiment forms a final image based on a latent image formed by the optical scanning device 100. Therefore, it is possible to form the image on the sheet 61 with accuracy.

Furthermore, in the image forming apparatus 500 according to the present embodiment, the splitting optical element 13 lets laser beams including a principal ray emitted from the VCSELs of the light source 10 to pass therethrough, and reflects the other laser beams, and thereby splitting laser beams from the light source 10 into two. Therefore, it is possible to scan each of the photosensitive drums 30A to 30D with high-intensity laser beams and also to monitor an intensity of the laser beams from the light source 10 with the reflected laser beams that are not used for scanning. Thus, it is possible to improve the use efficiency of the laser beams.

Moreover, in the above embodiment, there is explained the image forming apparatus 500 that includes the photosensitive drums 30A to 30D and is capable of forming a multicolor image. However, the present invention is not limited to such an image forming apparatus. For example, the present invention can be applied to an image forming apparatus that forms a single-color image by scanning a single photosensitive element with a plurality of laser beams.

Furthermore, in the above embodiment, the optical scanning device 100 according to the present invention is used in the printer. Alternatively, the optical scanning device 100 can be applied to an image forming apparatus other than the printer, such as a copier, a facsimile machine, or a multifunction product (MFP) including functions of the printer, the copier, and the facsimile machine.

According to an aspect of the present invention, when a position and an angle of an light source device are to be adjusted, it is possible to adjust the position and the angle of the light source device accurately without any fluctuations in relative positions of a light source, an optical element, a splitting element, a compensating element, and a light-receiving element.

Furthermore, according to another aspect of the present invention, it is possible to adjust optical characteristics of a scanning optical system accurately.

Moreover, according to still another aspect of the present invention, it is possible to form an image on a recording medium with high accuracy.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An optical scanning device comprising:
a light source in which a plurality of light-emitting units, each emitting a laser beam, are arranged in a two-dimensional array;
an optical element that changes a divergence angle of each of the laser beams emitted from the light-emitting units;
a first supporting member that has a contact portion with which the light source makes contact;
a splitting element that splits a part of each of the laser beams passing through the optical element, and wherein the optical element is located between the light source and the splitting element, such that the laser beams pass through the optical element before being split by the splitting element;
a light receiving unit that holds a light-receiving element, and wherein the light-receiving element receives the laser beams split by the splitting element, and outputs a signal used to control an intensity of the laser beams emitted from the light emitting units, the light-receiving element being configured such that the laser beams that are received by the light-receiving element pass through the optical element before being split by the splitting element;
a second supporting member that supports the optical element and the splitting element; and
an input optical system that inputs the laser beams split by the splitting element to the light-receiving element,
wherein the light source, the optical element, the splitting element, the light-receiving element, and the input optical system are integrally supported, and wherein the second supporting member and the light receiving unit are supported by the first supporting member, and the second supporting member is fixed to the first supporting member such that a relative position between the light source and the light-receiving element is fixed, and the optical scanning device includes a ring-like convex portion,
the optical scanning device further includes an optical housing, and wherein the optical housing includes a circular hole, and the ring-like convex portion is fitted into the circular hole, and
the optical scanning device further includes: a substrate on which the light source is mounted, wherein the first supporting member supports the substrate, and the optical scanning device includes a pressing member that presses the light source against the contact portion via the substrate.

2. The optical scanning device according to claim 1, wherein the splitting element is arranged on an optical axis of the optical element upon completion of an adjustment of the optical element.

3. The optical scanning device according to claim 1, further comprising a third supporting member that supports the input optical system such that the input optical system keeps a constant positional relation with the light source.

4. The optical scanning device according to claim 1, wherein the second supporting member has a contact surface with which the light-receiving element makes contact.

5. The optical scanning device according to claim 1, wherein the pressing member includes an anchor portion for controlling a movement in a direction perpendicular to an optical axis of the optical element.

6. The optical scanning device according to claim 1, wherein the first supporting member includes a positioning portion for controlling a position in a direction perpendicular to an optical axis of the light source.

7. The optical scanning device according to claim 1, further comprising a reinforcing member that maintains relative positions of the first supporting member and the substrate.

8. An optical scanning device according to claim 1, wherein the optical scanning device is configured to scan a scanning surface in a main scanning direction with a laser beam, and wherein the optical scanning device further comprises a scanning optical system that deflects a laser beam in the main scanning direction to scan the scanning surface.

9. An image forming apparatus that forms an image on a recording medium by fixing a toner image formed from a latent image that is obtained from image data corresponding to the image, the image forming apparatus comprising: an optical scanning device according to claim 8; a photosensitive element on which the latent image is formed by the optical scanning device; a developing unit that develops the latent image formed on the photosensitive element with toner to form a toner image; a transfer unit that transfers the toner image onto the recording medium; and a fixing unit that fixes the toner image on the recording medium.

10. An image forming apparatus that forms a color image on a recording medium by transferring toner images formed from latent images for different colors obtained from image data corresponding to the color image onto the recording medium in a superimposed manner and fixing the toner images on the recording medium, the image forming apparatus comprising: an optical scanning device according to claim 8; a plurality of photosensitive elements on each of which the latent image is formed by the optical scanning device; a developing unit that develops the latent image formed on the photosensitive element with toner to form a toner image; a transfer unit that transfers toner images of different colors onto the recording medium in a superimposed manner; and a fixing unit that fixes superimposed toner images on the recording medium.

11. The optical scanning device according to claim 1, further comprising a compensating element that compensates for a fluctuation in the divergence angle of each of the laser beams due to a change of temperature, wherein the splitting element splits a part of each of the laser beams passing through the compensating element, and wherein the compensating element is located between the light source and the splitting element, such that the laser beams pass through the compensating element before being split by the splitting element, and wherein the light-receiving element is configured such that the laser beams that are received by the light-receiving element pass through the compensating element before being split by the splitting element.

12. A method of adjusting an interval between scanning lines on a scanning surface of an image forming apparatus, comprising the steps of:
    providing an optical scanning unit including:
        a light source in which a plurality of light-emitting units, each emitting a laser beam, are arranged in a two-dimensional array;
        an optical element that changes a divergence angle of each of the laser beams emitted from the light-emitting units;
        a first supporting member that has a contact portion with which the light source makes contact;
        a splitting element that splits a part of each of the laser beams passing through the optical element, and wherein the optical element is located between the light source and the splitting element, such that the laser beams pass through the optical element before being split by the splitting element;
        a light receiving unit that holds a light-receiving element, and wherein the light-receiving element receives the laser beams split by the splitting element, and outputs a signal used to control an intensity of the laser beams emitted from the light emitting units, the light-receiving element being configured such that the laser beams that are received by the light-receiving element pass through the optical element before being split by the splitting element;
        a second supporting member that supports the optical element and the splitting element; and
        an input optical system that inputs the laser beams split by the splitting element to the light-receiving element,
    wherein the light source, the optical element, the splitting element, the light-receiving element, and the input optical system are integrally supported, and wherein the second supporting member and the light receiving unit are supported by the first supporting member, and the second supporting member is fixed to the first supporting member such that a relative position between the light source and the light-receiving element is fixed, and the optical scanning unit includes a ring-like convex portion,
    the optical scanning unit further includes an optical housing, and wherein the optical housing includes a circular hole, and the ring-like convex portion is fitted into the circular hole, and
    the optical scanning unit further includes: a substrate on which the light source is mounted, wherein the first supporting member supports the substrate, and the optical scanning unit includes a pressing member that presses the light source against the contact portion via the substrate; and
adjusting the interval between the scanning lines on the scanning surface by rotating the light source about an optical axis of the optical element relative to the optical housing at a fitted portion of the ring-like convex portion and the circular hole.

* * * * *